R. E. HELLMUND.
MOTOR FOR PULSATING CURRENT.
APPLICATION FILED AUG. 7, 1916.

1,278,924.

Patented Sept. 17, 1918.
2 SHEETS—SHEET 1.

WITNESSES:
R. J. Fitzgerald
L. C. Davis

INVENTOR
Rudolf E. Hellmund.
BY
Wesley G. Carr
ATTORNEY

R. E. HELLMUND.
MOTOR FOR PULSATING CURRENT.
APPLICATION FILED AUG. 7, 1916.

1,278,924.

Patented Sept. 17, 1918.
2 SHEETS—SHEET 2.

WITNESSES:
Ed. V. Herron
D. C. Davis.

INVENTOR
Rudolf E. Hellmund
BY
Wesley G. Carr
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC AND MANUFACTURING COMPANY, A CORPORATION OF PENNSYLVANIA.

MOTOR FOR PULSATING CURRENT.

1,278,924.   Specification of Letters Patent.   Patented Sept. 17, 1918.

Application filed August 7, 1916. Serial No. 113,453.

*To all whom it may concern:*

Be it known that I, RUDOLF E. HELLMUND, a subject of the Emperor of Germany, and a resident of Swissvale, in the county of Allegheny and State of Pennsylvania, have invented a new and useful Improvement in Motors for Pulsating Current, of which the following is a specification.

My invention relates to electric motors of the commutator type particularly designed for operation upon pulsating supply circuits, such, for example, as those supplied from vapor converters, and it has for its object to provide apparatus of the character designated that shall operate with freedom from sparking, vibratory torque and inductive disturbance of neighboring circuits.

Figure 1:
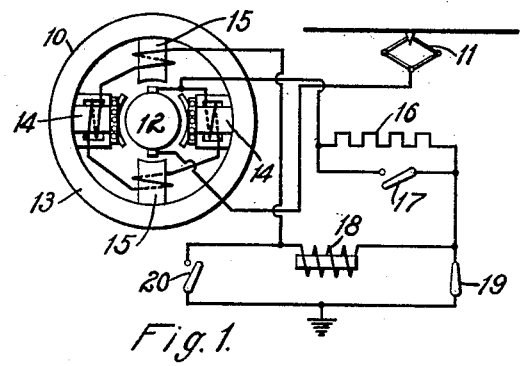
Figure 3:
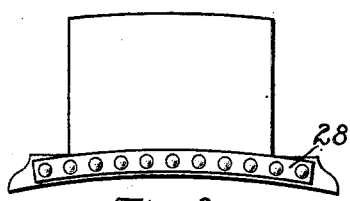
Figure 4:
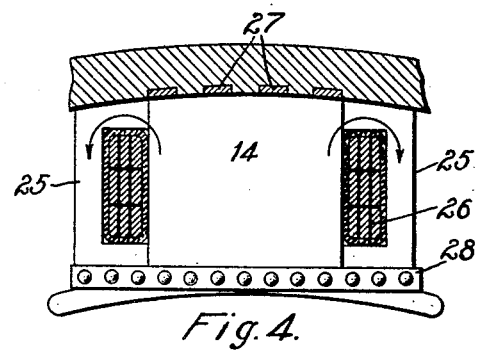
Figure 5:
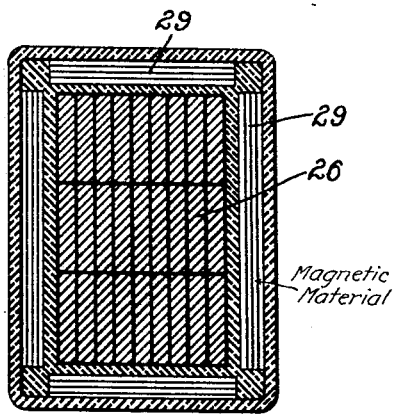
Figure 6:
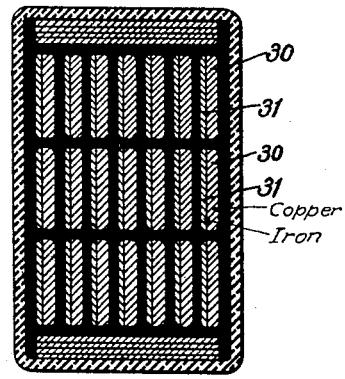
Figure 7:
Figure 8:
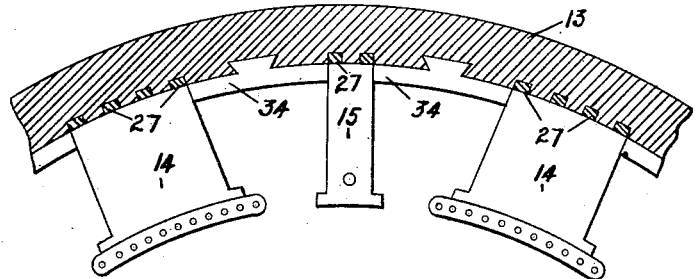
Figure 9:
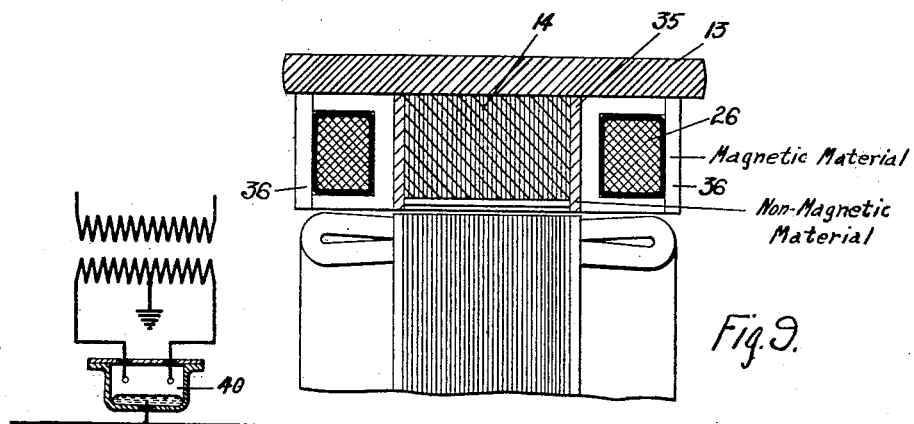
Figure 2:
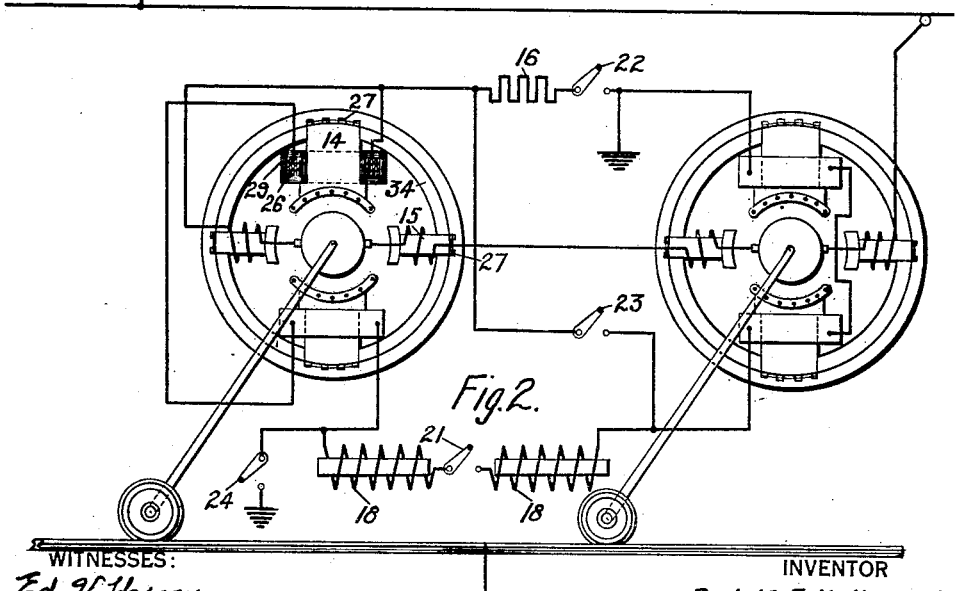

In the accompanying drawings, Figures 1 and 2 are diagrammatic views of commutator motors, together with associated apparatus, embodying certain forms of my invention; Fig. 3 is a side view, in elevation, of a pole piece provided with a facial damping winding, as employed in the apparatus of Fig. 1; Fig. 4 is a detail view of a field pole, as shown in Fig. 3, together with an additional damping winding at the base thereof and with a magnetic bridge surrounding the field coil; Fig. 5 is a cross sectional view of a field coil employed in one form of my device, said field coil being provided with an inclosing layer of laminated magnetic material for a purpose to be hereinafter described; Fig. 6 is a cross sectional view of another form of field coil, wherein the conductors are formed partially of magnetic material and partially of non-magnetic material; Fig. 7 is a cross sectional view of a well known type of bimetallic material which may be employed in the construction of a field winding conforming to my invention; Fig. 8 is a fragmentary view of the stator of an electric motor, partially in section and partially in elevation, showing the flux-bridging construction employed in a motor having interpoles; and Fig. 9 is a fragmentary sectional view of a motor showing another form of magnetic shunt associated with a field coil for assisting in the operation upon pulsating current.

The ordinary direct-current electric motor has a large portion of its magnetic circuit formed of solid iron masses because of the cheapness and general suitability of this form of construction, but when it is attempted to operate a motor of this character upon pulsating current, such, for example, as is produced by a vapor converter, the resultant flux pulsations produce eddy currents and consequent undesirable heating in said iron masses. Furthermore, the pulsating flux tends to produce a pulsating field in the neighborhood of the machine, disturbing adjacent telephone circuits in addition to inducing harmful electromotive forces in the short-circuited armature coils undergoing commutation, with attendant sparking.

It is a well known fact that any pulsating quantity, such, for example, as a magnetic flux or an electromotive force, may be considered as the sum of a uniform or non-variable quantity and of an alternating-current quantity; that is to say, the ordinary pulsating current may be considered as a small alternating current superposed upon a relatively large non-varying current.

By my invention, I provide means whereby the alternating-current component of a pulsating supply, which is the disturbing factor, is so shunted from the normal working path as to be rendered substantially ineffective, whereas said non-varying component is permitted to flow substantially unimpeded. I apply my corrective means in two distinctive manners; first, by separating the incoming current into two components and supplying only the non-varying current to the motor field windings and, second, by suitable magnetic structures, I divert the alternating magnetic flux which is produced by such current pulsations as escape said first-named means and render said alternating magnetic component substantially harmless.

For a more detailed understanding of my invention, reference may now be had to Fig. 1, wherein a motor 10 of the series, commutator, compensated type is shown as energized from a trolley 11. Said motor is provided with an armature 12 and a field yoke 13 having main field poles 14—14 and cross-field poles 15—15. A resistor 16 is so arranged that it may be connected in parallel with the field windings of the motor 10 and said resistor may be short-circuited by a suitable switch 17. An inductive device 18 may be connected in series with the field winding, if the motor is grounded through a switch 19, or, if the motor circuit be grounded through a switch 20, said inductive device is excluded from the path of the motor current.

When operating the motor 10 upon pulsating current, the switches 17 and 20 are open and the switch 19 is closed, whereby the inductive device 18 is placed in series with the motor windings and the resistor winding 16 in shunt thereto. The inductive device 18 chokes back the alternating component of the supply current, forcing said component to traverse the non-inductive path through the resistor 16 where a portion of its energy is dissipated in heat and where it is ineffective in producing a disturbing magnetic field.

The system of Fig. 2 shows the system of Fig. 1 applied to two motors, as would be desirable in many car equipments. The main field windings of the two motors are connected in series with each other and, upon the closure of suitable switches 21 and 22, the main field windings are connected in series with inductive devices 18—18 and are shunted by a resistor 16, as previously described pulsating operating current being obtained from a vapor converter 40. By opening the switches 21 and 22 and closing the suitable switches 23 and 24, the circuit is transformed for proper operation upon non-varying current wherewith the presence of the resistor 16 in shunt to the field windings not only produces an undesirable energy loss but also tends to promote flashing.

To this point, I have described means for preventing the passage of the alternating-current component of the supply current to the field windings. Said means, while effective to a pronounced degree, does not entirely smooth out the field flux in the machine and I provide, therefore, additional means for the suppression of the alternating-current component of the main field flux. The simplest of said means is indicated in Fig. 3 and comprises merely the placing of a damping or amortisseur winding 28 in the pole face, whereby the alternating-current component is damped out and a portion of its energy dissipated in the heat produced by eddy currents.

It is more effective, however, to provide a more or less complete magnetic path for the alternating component flux, said path being preferably of low reluctance to minimize the leakage of said undesirable flux. To this end, I may employ the structure indicated in Fig. 1 and shown in greater detail in Fig. 4. Said structure comprises a magnetic bridge 25—25, spanning the field coil 26 of a pole piece 14, said magnetic bridge preferably being laminated to reduce heating. A damping winding 27 is embedded in the yoke of field frame at the base of the pole piece 14, and a damping grid 28 may also be employed if desired. With the structure shown, the alternating-current component of the main field flux encounters marked opposition in the damping winding 27 and, therefore, encircles the field windings 26 through the bridge member 25, as indicated by arrows, but the non-varying component of the main field flux readily flows through the damper 27 and traverses the field frame in the usual manner.

I may, if desired, produce the laminated bridge or shunt interlinked with the field coil in the manner shown in Fig. 5, wherein plates 29—29 of magnetic material are embedded in the insulation of the main field coil 26 to perform the function of the bridge 25—25 in the structure of Fig. 4.

Another effective form of flux-shunting is produced as shown in Fig. 6 wherein the conductors 30—30 of the main field coil, composed preferably of copper, are each associated with a strip of magnetic material 31—31, whereby magnetic flux may readily encircle each unidirectional conductor of the field coil and thus the disturbing flux is effectually restrained to its point of inception and, therefore, prevented from producing undesired disturbance.

Bimetallic conductors of the cross section shown in Fig. 7 comprising a copper core 32 provided with an iron sheath 33 may now be obtained and, by winding a field coil with a conductor of this nature, a very effective damping action of the nature disclosed in connection with Fig. 6 may be obtained.

In supplying motors of the interpole type with pulsating current, it is desirable that the main flux be smoothed out in order to provide a uniform torque and to minimize inductive disturbances but, on the other hand, it is desirable that the interpole flux shall pulsate with the supply in order to balance the sparking voltages which inherently pulsate with the supply. I employ, therefore, the structure shown in Fig. 8 wherein a main field yoke 13, formed of solid material, such, for example, as cast iron, supports main pole pieces 14—14 and an interpole 15. The said pole pieces are seated directly upon the inner surface of said yoke and they are provided with damping windings 27—27 at their bases in order to prevent the passage of alternating flux therefrom into said solid yoke. Laminated bridges 34—34 of magnetic material are dove-tailed or otherwise fastened to the inner surface of the yoke member 13 and span the space between the bases of the pole pieces, together forming a supplementary field yoke of laminated material screened from the main yoke 13 by the damping windings 27—27. In operation, the main working flux flows partially through the yoke 13 and partially through the auxiliary yoke 34 but all the alternating flux is forced to flow in the member 34 where it cannot produce eddy currents. By this construction, a machine costing but little more than the ordinary solid-yoke machine is produced but all the alternating-current component of the working flux is forced to traverse a special laminated structure where it is unable to produce eddy currents. I may apply to the field poles 14—14 of Fig. 8 any of the magnetic shunts disclosed in the other figures of the drawing whereby the function of the members 34—34 is to carry solely that portion of the alternating-current component of the field flux that must be supplied at the interpole 15—15 for the proper compensation of the sparking voltage.

In the form of my invention shown in Fig. 9, a field pole 14 mounted on the inner surface of a yoke 13 is surrounded with a damping sleeve 35, preferably constructed of copper, said sleeve thus performing the function of the damping grid hitherto disclosed. The field coil 26 is disposed outside the sleeve 35, and the field coil is encircled by shunting means 36—36. Said shunting means do not extend between the pole pieces, thus permitting a more compact design. The member 35, being of non-magnetic material, causes the alternating fluxes in the member 36 to remain therein, preventing the saturation of adjacent portions of the main pole piece 14.

While I have shown my invention in a plurality of forms it will be obvious to those skilled in the art that it is susceptible of various minor changes and modifications without departing from the spirit thereof and I desire, therefore, that only such limitations shall be placed thereupon as are imposed by the prior art or as are indicated in the appended claims.

I claim as my invention:

1. In a motor adapted for operation on pulsating current, a magnetic yoke comprising an outer annular ring of solid material and an inner annular ring of laminated material, laminated field poles seated upon said outer ring and projecting through said inner ring, and exciting windings for said field poles.

2. In a motor adapted for operation on pulsating current, a magnetic yoke comprising an outer annular ring of solid material and an inner annular ring of laminated material, laminated field poles seated upon said outer ring and projecting through said inner ring, exciting windings for said field poles and damping grids embedded at the bases of said field poles for forcing flux pulsations through said laminated yoke portion while permitting constant flux to flow through said solid portion.

3. In a motor adapted for operation on pulsating current, a magnetic yoke comprising an outer solid annular portion and an inner laminated annular portion, main and cross-field pole pieces seated upon said outer annular portion and projecting through said inner annular portion, damping grids embedded at the bases of said field pole pieces, and exciting means for said pole pieces.

4. In a motor adapted for operation on pulsating current, the combination with a yoke, of a main pole piece mounted thereupon, a field coil upon said pole piece, and means for producing a closed magnetic path for flux from said coil, said means not including said yoke.

5. In a motor adapted for operation on pulsating current, the combination with a yoke, of a pole piece mounted thereupon, a field coil on said pole piece, and a bridge of magnetic material embracing said field coil.

6. In a motor adapted for operation on pulsating current, the combination with a yoke, of a pole piece mounted thereupon, a field coil on said pole piece, laminated magnetic material associated with said field coil to form a low-reluctance magnetic path for flux therefrom, and a damping device associated with said field pole and operative to force flux pulsations into said low-reluctance path while permitting the main flux to enter the yoke.

In testimony whereof I have hereunto subscribed my name this 21st day of July, 1916.

RUDOLF E. HELLMUND.

Copies of this patent may be obtained for five cents each, by addressing the "Commissioner of Patents, Washington, D. C."